No. 743,544. PATENTED NOV. 10, 1903.
P. E. MYERS.
NUT LOCK.
APPLICATION FILED AUG. 9, 1902. RENEWED SEPT. 17, 1903.
NO MODEL.
Fig. 1.
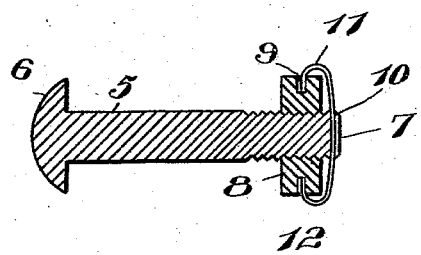
Fig. 2. Fig. 3.
 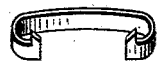
Fig. 4. Fig. 5.
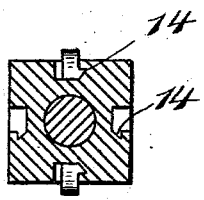 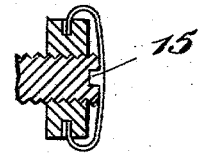
Fig. 6.
WITNESSES. INVENTOR
*T. P. Brett* P. E. Myers,
BY *Chandler & Chandler*
Attorneys
THE NORRIS PETERS CO., PHOTO-LITHO., WASHINGTON, D. C.

No. 743,544. Patented November 10, 1903.

UNITED STATES PATENT OFFICE.

PARIS ELIGA MYERS, OF GRANDVIEW, IOWA.

NUT-LOCK.

SPECIFICATION forming part of Letters Patent No. 743,544, dated November 10, 1903.

Application filed August 9, 1902. Renewed September 17, 1903. Serial No. 173,623. (No model.)

*To all whom it may concern:*

Be it known that I, PARIS ELIGA MYERS, a citizen of the United States, residing at Grandview, in the county of Louisa, State of Iowa, have invented certain new and useful Improvements in Nut-Locks; and I do hereby declare the following to be a full, clear, and exact description of the invention, such as will enable others skilled in the art to which it appertains to make and use the same.

This invention relates to nut-locks; and it has for its object to provide a construction wherein after the nut has been screwed down to the proper extent it may be locked and will be held securely against return movement while the nut is at various distances from the end of the bolt.

A further object of the invention is to provide a construction wherein accidental disengagement of the lock will be prevented.

In the drawings forming a portion of this specification, and in which like numerals of reference indicate similar parts in the several views, Figure 1 is a longitudinal section through a bolt having a nut locked thereon, the whole embodying the present invention. Fig. 2 is a detail perspective view of the locking-spring. Fig. 3 is a view similar to Fig. 2 and showing a modified form of locking-spring. Fig. 4 is a horizontal section through a nut and bolt and showing the engaging ends of the modified form of locking-spring. Fig. 5 is a sectional view of a portion of a bolt with its nut and locking-spring and showing a further modification. Fig. 6 is an end view of the bolt shown in Fig. 5.

Referring now to the drawings, and more particularly to Figs. 1 and 2 thereof, there is shown a bolt comprising a stem 5 and a head 6, the stem being threaded in the usual manner at its end remote from the head and in the extremity of which threaded end is the transverse groove 7. A nut 8 is provided for the bolt and is threaded and screwed upon the bolt, and in each side face of the nut is formed a recess 9, there being but a single one of these recesses in each face, as shown.

In connection with the bolt and nut is employed a locking-spring 10, including the spaced arc-shaped members 11 and 12, having a connecting-web, said spaced members being curved outwardly or away from each other in a common plane, so that their free ends are directed toward each other.

In practice the nut is screwed onto the bolt until the proper position thereon is reached, after which the web of the locking-spring is engaged in the terminal slot of the bolt and the free ends of the arcuate spaced members 11 and 12 are engaged in the recesses 9 of two opposite faces of the nut, thus holding the nut firmly against return rotation, as will be readily understood. By reason of the arc shape of the spaced members 11 and 12 they may be distorted or stretched in the directions of their chords, so that their extremities will engage recesses of the nut in various positions of the nut longitudinally of the bolt, as will be readily understood.

In Figs. 3 and 4 of the drawings is illustrated a modification wherein the free ends of the locking-spring are barbed to engage in the concavities 14 in the sides of the recesses.

In Fig. 5 of the drawings there is shown in section a bolt and nut having a locking-spring similar to that shown in Fig. 1. The bolt, however, instead of being slotted has an angular socket in its end, in which is engaged removably the correspondingly-shaped lug 15 on the under side of the web portion of the locking-spring.

In practice other modifications of the invention may be made and any suitable materials and proportions may be used for the various parts without departing from the spirit of the invention.

What is claimed is—

The combination with a threaded body and a nut engaged therewith and having recesses in its side faces respectively, the sides of which recesses are recessed, of a lock consisting of a flat spring-metal plate comprising spaced elastic arc-shaped members and an elastic connecting-web, the web portion being engaged with the threaded body and the free ends of the spaced members having lateral barbs for engagement with the concavities of corresponding recesses of the nut when the extremities of the lock are seated in the recesses.

In testimony whereof I affix my signature in presence of two witnesses.

PARIS ELIGA MYERS.

Witnesses:
J. W. REESE,
R. F. GAST.